United States Patent [19]

Bobis

[11] Patent Number: 5,354,191
[45] Date of Patent: Oct. 11, 1994

[54] MOLDING APPARATUS FOR FORMING FROZEN FOOD PRODUCT AND COMPOSITE COVER AND HOLDER FOR USE THEREIN

[76] Inventor: Daniel H. Bobis, 568 Scotland Rd., Union, N.J. 07083

[21] Appl. No.: 131,403

[22] Filed: Oct. 1, 1993

[51] Int. Cl.⁵ ............................................ A23G 9/26
[52] U.S. Cl. ................................... 425/118; 249/92; 294/87.11; 425/126.2
[58] Field of Search .................. 249/92, 121, 91; 425/126.2, 118; 294/87.11

[56] References Cited

U.S. PATENT DOCUMENTS

| | | | |
|---|---|---|---|
| D. 188,386 | 7/1960 | Hulterstrum et al. | D44/1 |
| D. 188,992 | 10/1960 | Morrison | D44/1 |
| D. 269,578 | 7/1983 | Straubinger | D7/43 |
| 478,861 | 7/1892 | Howard | 249/92 |
| 1,151,869 | 8/1915 | Freeburg | 249/92 |
| 1,628,434 | 5/1927 | Schnaier | 249/92 |
| 1,743,375 | 1/1930 | Mundorff, Jr. | 249/92 |
| 1,987,945 | 1/1935 | Schnaier | 249/92 |
| 2,003,612 | 6/1935 | Schnaier | 107/19 |
| 2,032,483 | 3/1936 | Isenberg | 107/19 |
| 2,036,706 | 4/1936 | Law | 107/19 |
| 2,052,496 | 8/1936 | Stassi | 65/13 |
| 2,355,010 | 8/1944 | Pera | 65/13 |
| 2,599,919 | 6/1952 | Hucknall | 65/13 |
| 2,766,123 | 10/1956 | Moubayed | 99/137 |
| 2,946,207 | 7/1960 | Hulterstrum | 249/92 |
| 3,411,463 | 11/1968 | Moseres | 107/19 |
| 4,091,632 | 5/1978 | Marchewka | 62/1 |
| 4,239,175 | 12/1980 | Straubinger | 249/92 |
| 4,942,044 | 7/1990 | Ruggieri | 426/2 |

Primary Examiner—Khanh Nguyen
Attorney, Agent, or Firm—Lerner, David, Littenberg, Krumholz & Mentlik

[57] ABSTRACT

Molding apparatus for forming and preparing frozen food products from liquids having at least one or more containers forming compartments for freezing the liquids has coacting cover and holder assemblies for each of the containers shaped to define a reservoir for collecting portions of melted frozen food product and having an elongated member connected in the generally longitudinal line of the cover and holder assembly so that the portion thereof exterior of the cover and holder assembly forms a handle and the portion extending through the interior of the cover and handle assembly forms an anchor on which the frozen food product is formed so that the frozen food product and the cover and holder assembly can be removed together, to enable the frozen food product to be consumed, and a passageway in the anchor having one end in communication with the reservoir in the cover and holder assembly and the opposite or remote end forms an access opening, and a removable or consumable sealing member maintains the passageway normally closed until the access opening end of the passageway is exposed during consumption of the frozen food product. The removable or consumable sealing member may be an edible confection, a formed plug, a rod which respectively fit or occlude the opening in the concealed access opening end and the adjacent portion of the passageway.

13 Claims, 3 Drawing Sheets

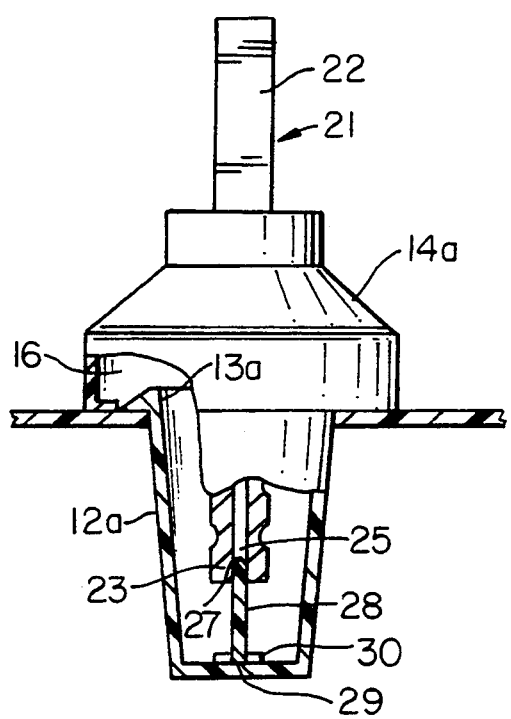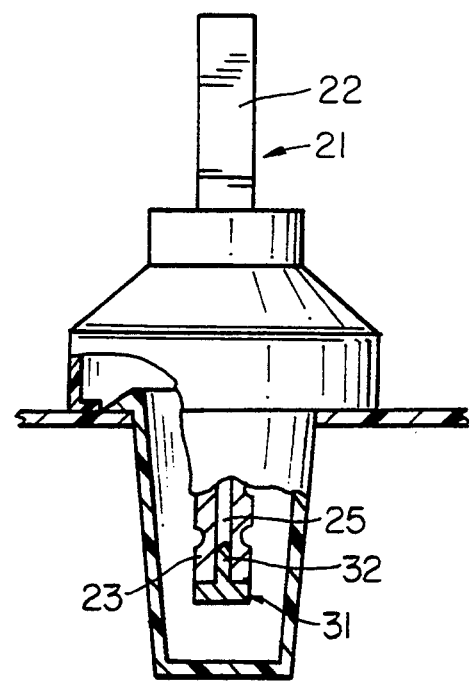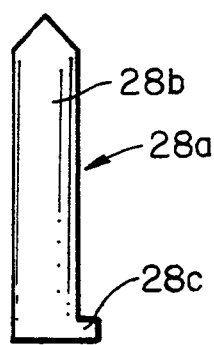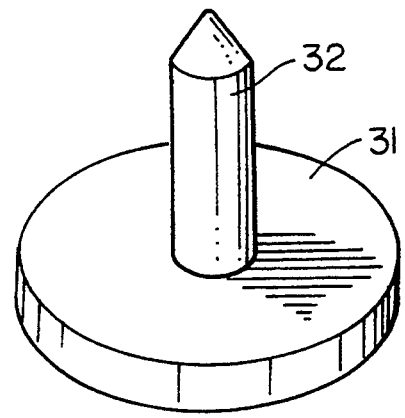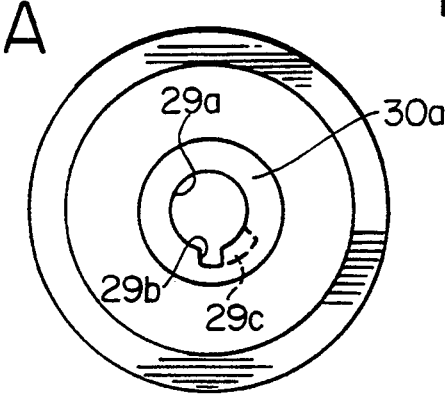

MOLDING APPARATUS FOR FORMING FROZEN FOOD PRODUCT AND COMPOSITE COVER AND HOLDER FOR USE THEREIN

BACKGROUND OF THE INVENTION

This invention relates generally to molding apparatus and the elements thereof for preparing frozen food products from liquids and solutions, and more particularly to a cover and holder assembly operatively connectible in the molding apparatus and removable with the frozen food product such that, after the frozen food product has been removed from the molding apparatus and is being consumed, the melted portions thereof can be collected in the cover and holder assembly and suctioned or drawn off by the consumer of the frozen food product.

Molding apparatus for forming and preparing frozen food products are known in the prior art.

In U.S. Pat. No. 4,239,175 one such molding apparatus is shown which includes, associated cap members having handle members, anchor members for connecting the cap members to the formed frozen food product and so shaped that, when they are removed from the molding apparatus with the frozen food product, such cap members serve as drip trays for melted portions of the frozen food product. And straw members are provided on each cap member so the user or consumer of the frozen food product can draw off the collected and melted food product in the conventional manner.

The straw member for each respective cap member in the molding apparatus as shown in Pat '175 is connected to and formed on the outer surface of the associated cap member and communicates at one end with the interior of the cap member where the melted frozen food product collects. The straw member extends along the exterior side of the cap member so that the opposite open end is exposed adjacent to and above the top rim of the cap member. This permits the melted frozen food product to be drawn off by sucking on the open end of the straw member in the conventional manner but requires that the consumer lift the cap member to the consumer's mouth, which places the frozen food product squarely in front of the consumer's face when this is done.

U.S. Pat. No. 2,766,123 purports to show the combination of a frozen confection, and a cup member having a collecting reservoir. A centrally aligned member in the cup member has a portion exterior of the cup member in assembled position acting as a handle and the portion along the interior of the cup member serves as a pipette. The pipette portion in assembled position has one open end covered and in the frozen confection. The end remote from the end in the frozen confection communicates by suitable passage means with the collecting reservoir on the cup member. This patent suggests that when the open end of the pipette is exposed during the consumption of the frozen confection, the user or consumer of the frozen confection can then draw off the melted portion of the frozen confection collected in the cup member and its reservoir. However, this design is essentially inoperable because those skilled in the art will recognize that when conventional freezing processes at atmospheric pressure, the pipette will fill up with the liquid or other solution from which the frozen confection is made, and such liquid or solution will freeze in the pipette and remain in this frozen condition because of the frozen product which surrounds the pipette during consumption of the frozen product.

Therefore, contrary to the statements made in Pat '123, this assembly cannot function to accomplish withdrawing of the collected melted frozen food product nor can it be used to achieve the results of the cap assembly for the molding apparatus as shown in Pat '175.

In the present invention an improved cover and holder assembly is provided for use in molding apparatus forming a frozen food product and for holding the frozen food product which achieves more beneficial results than are shown and described in Pat '175 and overcomes the problems inherent in the cup assembly as shown and disclosed in Pat '123.

SUMMARY AND OBJECTS OF THE INVENTION

Thus, in the present invention the improved cap and holder assembly for holding the frozen food product made in containers of a molding apparatus is cup shaped. The open end of each of the cap and holder assemblies is sized to fit about and in snug engagement with the open end of an associated one of the containers in the molding apparatus in which the frozen food product is formed, and a suitable space or reservoir is provided in the cap and holder assemblies for collecting any melted frozen food product. Disposed in the generally longitudinal line of the composite cap and holder assembly is an elongated member, the portion of which exterior of the cap and holder assembly serves as a handle, and the portion which extends interiorly through the cap and holder assembly and into the associated container serves as an anchor for the frozen food product formed in the container. Thus the cap and holder assembly can be separated from the associated container with the frozen food product and will hold the same while it is being consumed. The anchor portion of the elongated member is further provided with passageways such that in assembled position during use of the cap and holder assembly, one end will communicate with the space or reservoir for collecting the melted frozen food product, and the open end of the passageway remote from the end communicating with the space or reservoir will have plug means therein to maintain the same normally closed during the freezing process and which can be removed and/or consumed by the consumer in order to withdraw the collected melted frozen food product from the space or reservoir of the given cap and holder assembly during the consumption of the frozen food product.

Accordingly, it is an object of the present invention to provide an improved molding apparatus for forming a frozen food product from liquids and solutions.

It is another object of the present invention to provide operatively associated cover and handle assemblies for the containers forming the freezing compartments in molding apparatus for forming frozen food products so formed that melted portions of the frozen food product are collected and the consumer can draw off such melted portions during the consumption of the frozen food product.

It is still another object of the present invention to provide an improved cover and handle assembly operatively connected to a frozen food product to be consumed which serves to collect melted frozen food product and to enable the consumer to draw off the melted portion during the consumption of the frozen food product.

It is still another object of the present invention to provide an improved cover and handle assembly operatively connected to a frozen food product to be consumed which serves to collect melted frozen food product and includes interiorly disposed passageways to enable the consumer to draw off the collected and melted portion during the consumption of the frozen food product.

It is still another object of the present invention to provide an improved cover and handle assembly operatively connected to a frozen food product to be consumed which serves to collect melted frozen food product and includes interiorly disposed passageways to enable the consumer to draw-off the melted portion during the consumption of the frozen food product, and wherein the interiorly disposed passageways have suitable plug means to maintain the interiorly disposed passageways normally closed which are removable and/or consumable to open said passageways at the convenience of the consumer.

Other objects and advantages will become apparent from the following description taken in conjunction with the accompanying drawings.

BRIEF DESCRIPTION OF THE DRAWINGS

FIG. 5 is a side elevation view partly in vertical section of one of the cap and holder assemblies in an associated container of the molding apparatus in FIG. 1 showing one plug means for sealing the end of the passageway in the anchoring section of the elongated member before the liquid has been frozen into the frozen food product, FIG. 5A is an enlarged side elevational view of an alternate plug means for sealing the end of the passageway in the anchor section of the elongated member, FIG. 5B is an enlarged bottom plan view of one of the containers of the molding apparatus in FIG. 1 of the drawings showing the alternate boss and catch assembly coacting with the alternate type of plug means shown in FIG. 5A of the drawings, FIG. 6 is a side elevation view partly in vertical section of one of the cap and holder assemblies in an associated container of the molding apparatus shown in FIG. 1 showing another means for sealing the end of the passageway in the anchor section of the elongated member before the liquid has been frozen into the frozen food product, FIG. 7 is an enlarged perspective view of the form of the plug means as a consumable member for the sealing means shown in FIG. 6 of the drawings.

DESCRIPTION OF ONE PREFERRED EMBODIMENT

Figure 1:
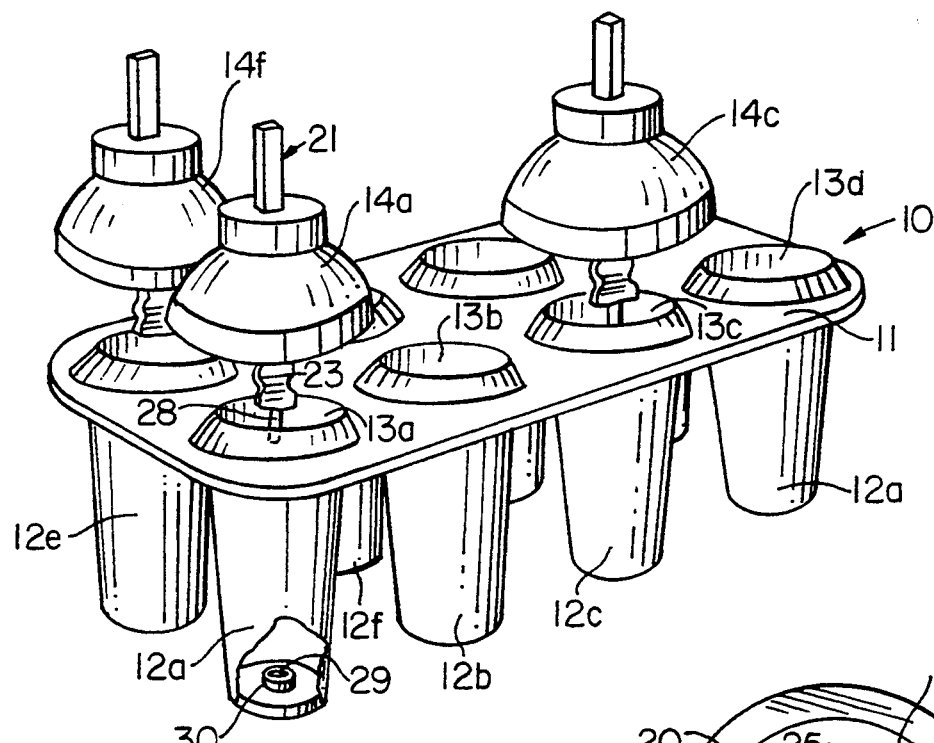
FIG. 1 is a perspective view of one form of molding apparatus with cap and holder assemblies in accordance with the present invention partly broken away to show the freezing compartment in one of the containers with a boss in the bottom thereof.
Figure 3:
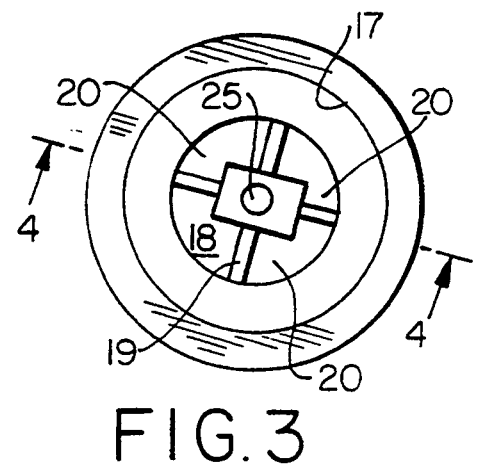
FIG. 3 is a bottom plan view of the cap and holder assembly shown in FIG. 2 without the plug means.
Figure 2:
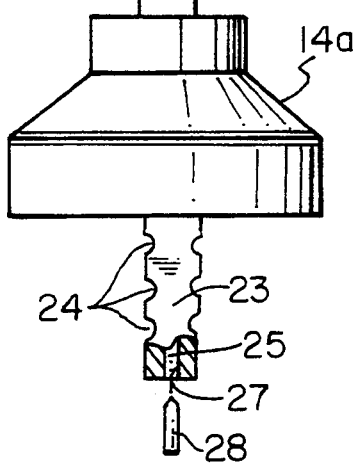
FIG. 2 is a side elevational view of one of the cap and holder assemblies for the molding apparatus shown in FIG. 1 partly broken away in vertical section and showing one form of plug means for maintaining the passageway in the anchor section normally closed exploded from assembled position.
Figure 4:
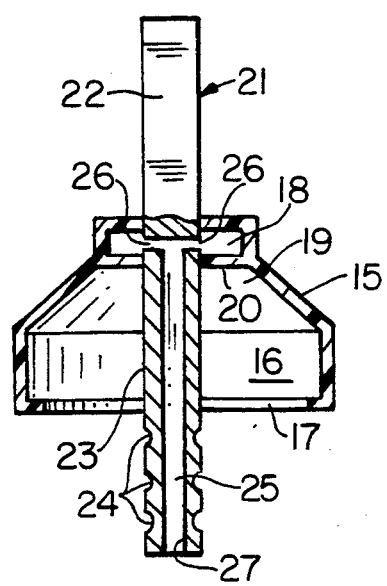
FIG. 4 is a cross-section taken on line 4—4 of FIG. 3.

The molding apparatus generally designated 10 shown in FIG. 1 of the drawings is for illustration purposes only. Those skilled in the art will recognize that other forms of this general type of molding apparatus can be used without departing from the scope of the present invention. Such molding apparatus is generally formed, shaped, cast, injection molded and made from some form of synthetic plastic materials so they can be sold as relatively low priced consumer products into the commercial marketplace.

Thus, molding apparatus 10 includes, a generally planar member 11 in which a plurality of freezing compartments are formed by shaped containers 12a, 12b, 12c, 12d, 12e, 12f, etc. which are mounted in the planar member 11 in spaced relation to each other by any suitable means. For example, these elements can be formed integrally from the same synthetic plastic material or the planar member can be cast from a synthetic plastic material with spaced openings into which the shaped containers will be fixedly or removably connected all depending on the particular form of the molding apparatus, the freezing procedures and the techniques for separating the frozen food product from the respective containers.

Each of the shaped containers 12a, 12b, 12c, 12d, etc. is open at the upper ends as at 13a, 13b, 13c, 13d, etc., into which the liquid to be frozen can be poured. Alternatively a suitable filling connection, not shown, can be provided for introducing the liquid to be frozen into the containers.

Operatively connected so as to cover the open ends 13a, 13b, 13c, 13d, etc. for each of the containers are a corresponding plurality of cover and holder assemblies generally designated 14a, 14c and 14f, only three of which are shown for purposes of illustration. Those skilled in the art will recognize that each of the containers 12a, 12b, 12c, etc. will coact with an associated one of the cover and holder assemblies as generally indicated by the cover and holder assemblies 14a, 14c and 14f. These composite cover and holder assemblies are also formed, cast, injection molded and made from any suitable type of synthetic plastic or the like materials.

Since each of the cover and holder assemblies for the molding apparatus 10 shown in FIG. 1 are preferably identical to each other to simplify the cost of manufacture and the use of the molding apparatus 10 by the ultimate consumer only one of such cover and holder assembly 14a is illustrated at FIGS. 2, 3, 4 and 5 of the drawings and described. The same character numerals used in this description are equally applicable to the other cover and holder assemblies illustrated at FIG. 1 of the drawings.

The cover and holder assemblies 14a, 14c and 14f are so shaped and formed that initially they serve both to cover the openings 13a, 13b, 13c, etc. for the respective containers 12a, 12b, 12c, etc. in which the liquid for forming the frozen food product is contained and to insert into this liquid a suitable member, rod or the like on which the frozen food product will form during the freezing process. Further, however, the cover and holder assemblies can each be removed with the frozen food product thereon from its associated container by any of a plurality of heating techniques, such as applying hot water to the outer surface of a container, and any given cover and holder assembly with the associated frozen food product thereon inverted to make the frozen food product available for consumption. In this position the given cover and holder assembly becomes a hand held device and collector of melted frozen food product for the convenience of the consumer of the frozen food product.

Thus, referring to FIGS. 1, 2, 3, 4 and 5 of the drawings, cover and holder assembly 14a is shown as generally cup shaped in side elevation. The walls 15 defining this cup shape form a main chamber 16 having a sized opening 17 at one end adapted to fit about and engage the opening 13a for the associated or coacting container 12a and an annular space or reservoir as at 18 outboard of a support spider 19 connected to the inner surface of the walls 15 transversely of the main chamber at a point remote from the sized opening 17. The space or reservoir 18 communicates with the main chamber 16 through the openings 20 formed in the support spider 19. When the frozen food product is being consumed, melted frozen food product collected in the main chamber 16 will flow freely into the space or reservoir 18 through the openings 20 in the support spider 19 where it can be removed by the consumer by suitable means as will be hereinafter described.

Those skilled in the art will recognize that instead of support spider reservoir 18 can be merely a space which communicates directly with the main chamber 16 or a partition, not shown, with spaced openings can also be used to provide such communication.

Connected to the section of the walls 15 remote from the sized opening 17 and the spider 19 so that it projects in the general longitudinal line of the cover and holder assembly 14a is an elongated member 21 which may be round, oval or rectangular in cross section. Elongated member 21 may be made of wood, plastic or waterproof paper stock each respectively formed to provide the desired shape, size, length and strength for the purposes and objects of the composite cover and holder assemblies of the present invention.

Elongated member 21 has an exterior section or handle 22 and an interior section or anchor 23. Elongated member 21 is connected to the walls 15 and the spider 19 in any suitable manner as, for example, being integrally molded therewith. The elongated member 21 extends from the exterior of the cover and holder assembly 14a where the handle 22 is located, and interiorly of the cover and holder assembly 14a where the anchor is located through the space or reservoir 18 and the main chamber 16, a predetermined distance beyond the sized opening 17 of the main chamber 16 formed by the walls 15. The extent to which the anchor 23 of the elongated member 21 extends past the sized opening 17 will be a function of the depth of the container holding the liquid from which the frozen food product is formed. Thus, interior section or anchor 23 of elongated member 21 must be sufficiently long to enable the frozen food product to be formed thereon and also have sufficient strength to enable the cover and holder assembly 14a to be removed with the frozen food product and to hold the frozen food product in assembled position thereon while it is being consumed.

To aid and abet the formation and holding of the frozen food product on the anchor 23 during the freezing process and the consumption of the frozen food product, a plurality of spaced cut outs as at 24 are provided. Alternatively, transverse ridges, not shown, can also be used.

The exterior section or handle 22 of the elongated member 21 enables the consumer to grip and hold the cover and holder assembly with the frozen food product thereon while the frozen food product is being consumed.

When the cover and holder assembly with the frozen food product thereon is being held and consumed, a portion of the frozen food product will melt. This melted portion of the frozen food product first collects in the main chamber 16 and then, by reason of the openings 20 in the spider 19, flows freely into the space or reservoir 18.

In order to enable the consumer to withdraw the melted portion of the frozen food product collected in the main chamber 16 and the space or reservoir 18 of the given cover and holder assembly 14a, the interior or anchor section 23 of the elongated member 21 is provided with a longitudinally extending passageway 25 which communicates at one end through side ports or ducts as at 26—26 with the space or reservoir 18 and at the end remote therefrom the passageway 25 is provided with an access opening 27 which will be exposed as the frozen food product is consumed. When this occurs, the consumer, by sucking at the access opening 27 for the passageway 25, draws off the melted portion of the frozen food product collected in the space or reservoir 18 and the main chamber 16.

However, those skilled in the art will readily recognize that for passageway 25 to operate properly, it must not be obstructed or occluded which would result during the freezing procedures for forming the frozen food product if the passageway is permitted to fill with the liquid from which the frozen food product is formed.

Therefore, in order to overcome this problem, the access opening 27 for the passageway 25 in the interior section or anchor 23 of the elongated member 21 is sealed by some suitable means to maintain the passageway 25 normally closed during the freezing process and if necessary during consumption of the frozen food product to prevent the liquid from which the frozen food product is made from filling the passageway 25 so such obstruction does not result.

In FIG. 5 one such means for accomplishing this is to provide a shaped member or plug as at 28 which snugly fits and engages in the access opening 27 and the adjacent portion of the passageway 25. The shaped member 28 can be made of any suitable type of material such as a confection which can be eaten as the frozen food product is being consumed. Alternatively, the shaped member can be some form of synthetic plastic which can be removed or which is automatically removed when the frozen food product is separated from the associated freezing container.

The shaped member or plug 28 is set into position before a given cover and holder assembly such as cover and holder assembly 14a is assembled on the associated container 12a as is shown in FIG. 5. Shaped member 28 will be so sized that not only will it act to occlude and maintain the passageway 25 normally closed but additionally will in assembled position engage and fit into a sized bore 29 in the boss 30 provided in the base of the associated container 12a, all of which is shown in FIGS. 1 and 5 of the drawings.

If the shaped member or plug 28 is made of a material which conducts heat easily, it will separate from assembled position in the access opening 27 and passageway 25 when the frozen food product is separated by the conventional heating techniques from the freezing container 12a.

FIGS. 5A and 5B show another form of plug 28a and the associated bore 29a and boss 30a in that plug 28a has a first end or portion as at 28b which is shaped to fit into the passageway 25 for the anchor section 23 of the elongated member 21 and at the opposite end has a lateral projection or lug 28c.

The plug 28a will be inserted into assembled position in the same manner as above described for the form of the invention shown in FIG. 5. However, when the cover and handle member 14a is assembled with this form of plug 28a, onto its associated container 12a, the lateral projection or lug 28c on plug 28a is fitted into a cut-out or opening 29b in the boss 30a. The cut-out or opening 29b communicates with an undercut 29c so that when the cover and holder assembly 14a is rotated, the lateral projection or lug 28c will engage and be held in assembled position by the undercut 29c. When the formed frozen food product is removed from the container, the plug 28b will remain in assembled position and thus clear the normally closed passageway 25 in the anchor section 23 of the elongated member 21.

In order to insure separation of plug 28a when the frozen food product is separated from the container, the plug 28a can be made of a member which conducts heat easily. If the conventional heat application type of operation of the molding apparatus 10 is used for separating the frozen food product, such heat conducting plug 28a will be automatically separated from assembled position in the passageway 25 when the frozen product is removed from the freezing compartment formed by the container 12a.

In FIG. 6, also showing the cover and holder assembly 14a and its associated container 12a, another plug device is shown for accomplishing this same result which is less complex in that the access opening 27 and the adjacent portion of the passageway 25 are plugged with a shaped and sized piece of chewable and consumable confection as at 31 which does not easily dissolve in the liquid or solution from which the frozen food product is made. This shaped and sized piece of confection 31 maintains the passageway 25 normally closed until the frozen food product has been consumed so as to expose the end of the anchor 23. At that time by removing or chewing the confection 31, the access opening 27 and passageway 25 will be opened and the consumer of the frozen food product can suck out through passageway 25 the melted frozen food product collected in the reservoir 18 and the main chamber 16.

FIG. 7 shows that the confection 31 will have a longitudinally extending sized member 32 which will have a tight sliding fit with the passageway 25 to hold the confection plug 31 in assembled position as shown in FIG. 6 of the drawings.

The form of the invention shown in FIGS. 6 and 7 has commercial advantages because the gum or candy plug must be replaced on each use of the molding apparatus. Therefore, the sale of the molding apparatus provides an additional product for sale to the ultimate user along with or collateral to the sale of the molding apparatus.

Figure 8:
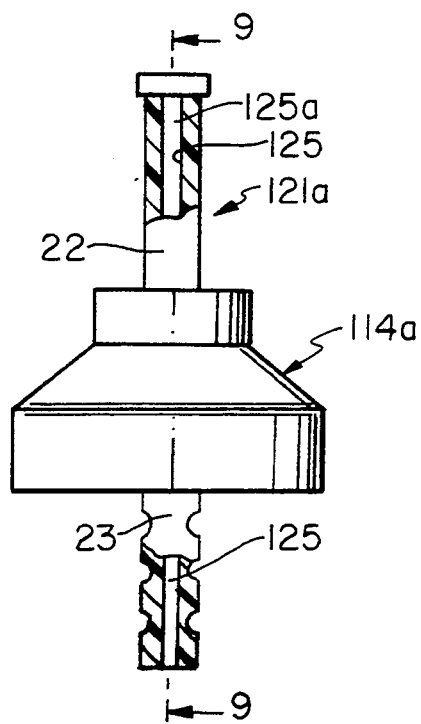
FIG. 8 is a side elevation view partly in vertical section of one of the cap and holder assemblies in an associated container of the molding apparatus shown in FIG. 1 of the drawings showing still another means for sealing the end of the passageway in the anchor section of the elongated member before the liquid has been frozen into the frozen food product.
Figure 9:
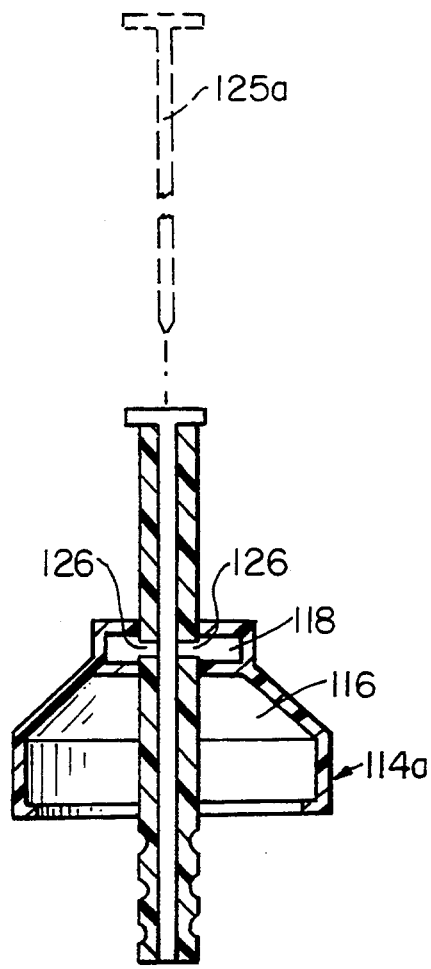
FIG. 9 is a vertical cross-section taken on line 9—9 of FIG. 8 with the plug for maintaining the passageway in the elongated member normally closed removed, as shown by the phantomized lines.

In FIGS. 8 and 9, a still further means for achieving the same result can be obtained by modifying the elongated member 21 so that the passageway 125 extends end to end the full longitudinal length of the elongated member 121 and providing a elongated rod 125a sized to form a snug engagement with the inner wall of the passageway 125 so that it seals the passageway 125 during the freezing and forming of the frozen food product in the associated container 112. In this form of the invention, when the anchor 123 is exposed, the elongated rod 125a can be removed and discarded to open the passageway 125 so the consumer can suck out the melted frozen food product collected in the reservoir 118 and the main chamber 116 for the cover and holder assembly 114a.

Alternatively, the elongated rod 125a can be limited in length so that it only covers and uncovers the transverse openings as at 126—126 which provide communication between the passageway 125 and the reservoir 118 so the collected and melted frozen food product can be drawn off when the transverse openings 126—126 are opened. For this purpose the elongated rod 125a can be threaded at the outer end of the passageway 125, or provided with some form of detent assembly to limit the movement of the elongated rod 125a, as will be understood by those skilled in the art.

The full length of the passageway 125 does not have to be sealed because fluid will not fill passageway 125 by reason of the shortened elongated rod 125a and the action of atmospheric pressure when it is in assembled position in the freezing compartment of the molding apparatus during the conventional freezing techniques at atmospheric pressure.

Figure 10:
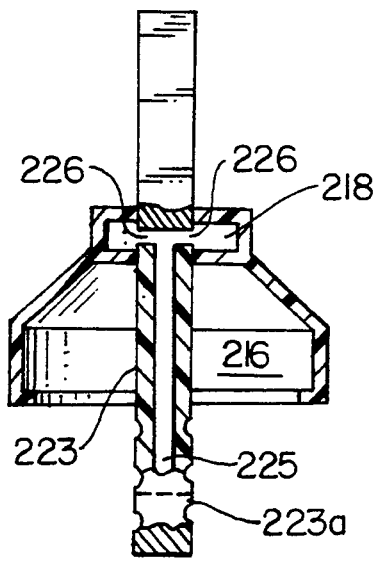
FIG. 10 is a cross-section similar to FIG. 4 showing another means of sealing the end of the passageway in the anchor section of the elongated member with a snap-off part to be used when it is desired to use the passageway for drawing off the collected and melted frozen food product.

Still another device for accomplishing this same result is shown in FIG. 10 in which the end of the anchor 223 remote from the ports or ducts 226 communicating with the space or reservoir 218 has a fixed seal so as to maintain the passageway 225 normally closed. When the anchor 223 is exposed during the consumption of the frozen food product, the anchor has a portion 223a that must be snapped off, bent, turned or otherwise treated so as to establish the desired access opening to render the passageway 225 functional, as has been above described, to enable the melted frozen food product collected in the reservoir 218 and the main chamber 216 for the given cover and holder assembly to be drawn off by the consumer by sucking on the now open end of the anchor 223.

While various forms of the present invention have been illustrated and described, it will be readily apparent to those skilled in the art that modifications and variations can be made without departing from the spirit of the invention, and it is intended to cover all such variations and modifications as come within the scope of the appended claims.

What is claimed is:

1. In molding apparatus for forming a frozen food product from liquids, the combination of at least one freezing compartment having an open end for receiving the liquids to be frozen with an associated cover and holder assembly operatively connectible to each said freezing compartment, said cover and holder assembly comprising, a. generally cup-shaped wall means defining a main chamber having an open end which fits the open end of said freezing compartment, and having a space defining a reservoir means, b. elongated means so connected to the cup-shaped wall means that the portion thereof at the exterior of the cup and holder assembly defines a handle section and the portion that extends through and beyond the interior of the open end of the main chamber defined by the cup-shaped wall means forms an anchor section, c. the portion of said elongated means extending through and beyond the interior of the wall means provides the anchor section on which the frozen food product is formed when the cover and holder assembly is in assembled position in the freezing compartment so that the cover and holder assembly can be removed with the formed frozen food product for consumption, d. passage means in at least the anchor section of the elongated means having one end communicating with the reservoir means, and a second end forming an access opening to be exposed during the consumption of the frozen food product to enable the consumer to withdraw any portion of the melted frozen food product collected in said reservoir, and e. means for generally sealing said passage means to maintain said passage means normally closed and to permit the passage means to be opened when the access opening end of the passage means is exposed during the consumption of the frozen food product.

2. In the combination of claim 1 wherein the sealing means is removable.

3. In the combination of claim 1 wherein the sealing means is alternatively removable and replaceable.

4. In the combination of claims 1 or 2 wherein the sealing means consists of a substance which is sufficiently malleable to be shaped, formed and fitted to occlude said passageway.

5. In the combination of claims 1 or 2 wherein the sealing means is a confection.

6. In the combination of claim 4 wherein the sealing means is a confection.

7. In the combination of claims 1 or 3 wherein the sealing means is a generally rod-like member of predetermined length having an outside diameter approximately equal to the inner diameter of the passage means.

8. The combination of claims 1 or 2 wherein the sealing means includes:

a. a generally rod like member of predetermined length having one end disposed to be fitted into said access opening for the passage means before the cover and holder assembly is positioned in the freezing compartment, b. boss means in said freezing compartment having a bore formed therein, and c. the opposite end of the rod like member to engage and fit in said bore of the boss means when the cover and holder assembly is positioned in the freezing compartment.

9. A cover and holder assembly for operative association with each of the freezing compartments in a molding apparatus for forming frozen food products from liquid materials comprising, a. cup-shaped wall means defining a main chamber having an open end, and means defining a reservoir to collect melted portions of the frozen food product during the consumption thereof, b. an elongated means disposed generally in the longitudinal line of said cover and holder assembly and having a portion thereof extending from the exterior of the cover and holder assembly to define a handle section and having a sized portion thereof extending through the interior of said cover and holder assembly and beyond the interior of the main chamber defined by the cup-shaped wall means to form an anchor section, c. the sized portion of said elongated member extending through and beyond the interior of the cover and holder assembly provides the anchor section for the forming of the frozen food product thereon when the cover and holder assembly is in assembled position in the freezing compartment, and d. said anchor section having a passage means communicating at one end with said reservoir means and at a second end forming an access opening to be exposed during the consumption of the frozen food product to permit the melted portion of the frozen food product collected in the reservoir means to be drawn off by the consumer, and e. means for generally sealing said passage means to maintain said passage means normally closed and to permit the passage means to be opened when the access opening end of the passage means is exposed during the consumption of the frozen food product.

10. In the cover and holder assembly as claimed in claim 9 wherein the sealing means is removable.

11. In the cover and holder assembly as claimed in claim 9 wherein the sealing means is removable and replaceable.

12. In the cover and holder assembly as claimed in claim 9 wherein the sealing means is a confection.

13. In the cover and holder assembly as claimed in claim 9 wherein the sealing means consists of a substance which is sufficiently malleable to be shaped, formed and fitted to occlude said passageway.

* * * * *